United States Patent
Willerton et al.

(10) Patent No.: US 6,226,578 B1
(45) Date of Patent: May 1, 2001

(54) ELECTRONIC CONTROL CIRCUIT FOR A VEHICLE SAFETY DEVICE

(75) Inventors: Mark Willerton, Vadstena (SE); Franck Lesbroussart, Courdimanche (FR)

(73) Assignee: Autoliv Development AB, Vågårda (SE)

(*) Notice: Subject to any disclaimer, the term of this patent is extended or adjusted under 35 U.S.C. 154(b) by 0 days.

(21) Appl. No.: 09/308,882
(22) PCT Filed: Nov. 26, 1997
(86) PCT No.: PCT/SE97/01986
§ 371 Date: Sep. 17, 1999
§ 102(e) Date: Sep. 17, 1999
(87) PCT Pub. No.: WO98/23470
PCT Pub. Date: Jun. 4, 1998

(30) Foreign Application Priority Data

Nov. 27, 1996 (GB) .................................................. 9624646

(51) Int. Cl.[7] .............................. G06F 7/00; B60R 21/32
(52) U.S. Cl. ............................ 701/36; 701/45; 280/734; 280/735; 307/9.1; 307/116; 340/436; 340/438
(58) Field of Search ...................... 701/45, 36; 280/734, 280/735; 307/9.1, 10.1, 121, 116; 340/438, 436

(56) References Cited

U.S. PATENT DOCUMENTS

| | | | |
|---|---|---|---|
| 4,166,641 | 9/1979 | Okada et al. | 280/735 |
| 4,979,763 | 12/1990 | Blackburn | 280/735 |
| 5,085,464 | 2/1992 | Behr et al. | 280/735 |
| 5,112,080 | 5/1992 | Okano | 280/735 |
| 5,338,062 | 8/1994 | Kiuchi et al. | 280/735 |
| 5,406,127 | * 4/1995 | Furui et al. | 307/10.1 |
| 5,416,360 | 5/1995 | Huber et al. | 307/10.1 |

FOREIGN PATENT DOCUMENTS

WO 97/48582   12/1997   (WO) .

* cited by examiner

Primary Examiner—William A. Cuchlinski, Jr.
Assistant Examiner—Yonel Beaulieu
(74) Attorney, Agent, or Firm—Venable; Robert Kinberg

(57) ABSTRACT

An electronic control circuit for a vehicle safety device includes an electrical activator responsive to a flow of current therethrough to activate the safety device. The electrical activator is present in a series connection including the activator and two switches. The series connection forms at least part of an electric circuit. The control circuit further includes a crash sensor producing an output signal when an accident is detected. A crash risk sensor produces an output signal when a certain crash risk is detected. One of the switches is closed in response to at least the output signal from the crash sensor. The other switch is closed in response to the output signals coming from both the crash sensor and from the crash risk sensor.

8 Claims, 2 Drawing Sheets

ELECTRONIC CONTROL CIRCUIT FOR A VEHICLE SAFETY DEVICE

BACKGROUND OF THE INVENTION

THE PRESENT INVENTION relates to an electric control circuit for a vehicle safety device, and more particularly relates to an electric control circuit for a vehicle safety device which may be activated by passing current through an electric resistor or squib.

An electric resistor or squib is often used, in the field of vehicle safety devices, as an initiator for a pyrotechnic charge. The pyrotechnic charge may form the operative part of a gas generator adapted to generate gas to inflate an air-bag, or may form part of a pre-tensioner, that is to say a device adapted to apply tension to a safety belt in the event that an accident should occur.

It has been proposed to connect the electric resistor that forms the initiator for the pyrotechnic charge in a series connection which includes two switches. Both of the switches must be closed before current can pass through the electric resistor. Typically, the switches are located one on either side of the electric resistor so that, when the switches are open, the electric resistor is totally isolated from the rest of the circuit. This minimises the risk of any current inadvertently passing through the electric resistor, which might activate the vehicle safety device at an inappropriate moment.

It has been proposed previously to provide two sensors, each sensor being adapted to close one of the two switches.

One of the sensors, which may be called a "safing sensor" or "crash risk sensor" is adapted to sense a parameter which indicates that the vehicle in which the safety device is fitted is exposed to a risk that a crash might occur. Typically, the safing sensor incorporates a spring-biassed mass that will respond to a medium level of deceleration. To ensure that the switch that is controlled by the safing sensor does not open in response to a short deceleration, as might occur during an accident, typically a pulse generator is provided which is associated with the safety sensor and which provides an extended pulse having an extended duration of, for example, 220 ms which ensures that the switch is maintained closed during this period of time. The crash risk sensor could also comprise a radar or some other device adapted to determine the speed of the vehicle relative to, the distance of the vehicle from, and/or the direction of an external object.

The purpose of the switch controlled by the safing sensor is to arm the arrangement when there is a risk that a crash may occur. At other times, the arrangement is not armed and thus the electric resistor is totally isolated from the rest of the circuit.

The other sensor, a crash sensor, may be an accelerometer associated with a microprocessor which is adapted to determine when the signal generated by the accelerometer is indicative that an accident is occurring.

Typically, the current is supplied, to one of the switches, from a capacitor which is charged by a charging circuit. If both the switches are closed, the entire charge of the capacitor passes through the resistor, thus causing the resistor to heat to a high temperature enabling the resistor to initiate the pyrotechnic charge.

However, with a prior-proposed arrangement of this type, some difficulties can arise.

Typically the switches are formed of MOSFET devices. If the MOSFET switch associated with the crash sensor suffers from "leakage", if the switch associated with the safety sensor is closed, for example, if the vehicle is driving along a bumpy road, the charge from the capacitor may leak away relatively slowly, without the pyrotechnic charge being activated. Should an accident then occur, there may be insufficient charge remaining on the capacitance in order to trigger the pyrotechnic charge.

Additionally, if, for example, there should be a failure of the MOSFET switch associated with the crash sensor, in such a way that the switch is conductive (or if there is a short circuit between the resistor and the battery) then as soon as the arming sensor closes the arming switch, the pyrotechnic charge will be ignited.

SUMMARY OF THE INVENTION

According to this invention there is provided an electronic control circuit for a vehicle safety device, comprising an electrical activator adapted to respond to the flow of current therethrough to activate the safety device, the electrical activator being present in a series connection, comprising the activator and two switches, the series connection forming at least part of an electric circuit, the control circuit comprising a crash sensor adapted to provide an output signal when an accident is detected, and a crash risk sensor adapted to provide an output when a certain crash risk is detected, one of the switches being closed in response to at least a signal from the crash sensor, the other switch being closed in response to signals coming both from the crash sensor and from the crash risk sensor.

Preferably the crash sensor is responsive to acceleration.

Conveniently the crash sensor incorporates an accelerometer and a microprocessor or computer means adapted to process the output signal from the accelerometer.

Preferably the crash risk sensor is associated with a pulse generator which, when activated by the crash risk sensor, generates an output pulse of a predetermined minimum duration.

Conveniently an output from the crash sensor and an output from the crash risk sensor are each fed to inputs of a AND-gate, the output of the AND-gate being adapted to close said other switch.

Advantageously the said switches are located, in the series circuit, on either side of the electrical activator, the electrical activator thus being electrically isolated when the switches are both open.

Conveniently the series electric circuit is associated with a capacitor and means adapted to charge the capacitance, the arrangement being such that when the said two switches are both closed, the electrical energy from the capacitor flows through the said electrical activator.

In one embodiment said one switch is closed in response to signals coming both from the crash sensor and from the crash risk sensor.

Electronic control circuits in accordance with the invention may be used in situations where the electrical activator activates an air bag or a safety belt pre-tensioner.

BRIEF DESCRIPTION OF THE INVENTION

In order that the invention may be more readily understood, and so that further features thereof may be appreciated, the invention will now be described, by way of example, with reference to the accompanying drawings in which.

DETAILED DESCRIPTION OF THE INVENTION

Like references will be used for like parts throughout the drawings.

Figure 1:
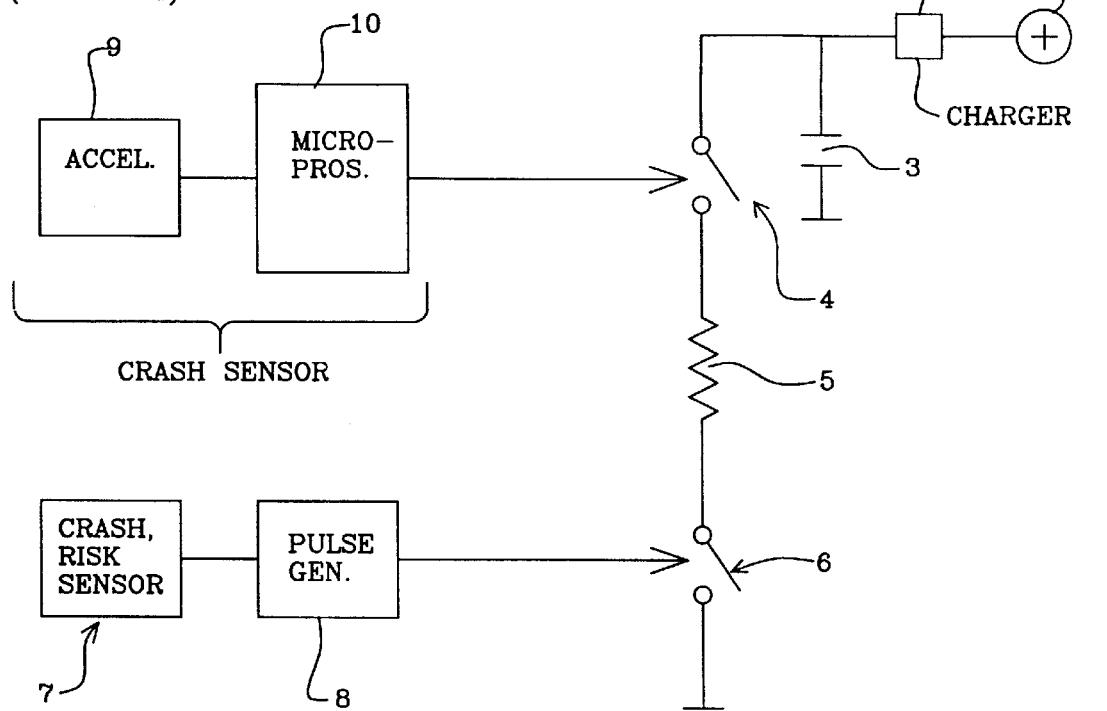
FIG. 1 is a block diagram of a prior proposed electronic control circuit.

Referring initially to FIG. 1 of the accompanying drawings, a prior electronic control circuit for a vehicle safety device is shown which comprises a charger 1 which is connected to a vehicle battery 2 which is adapted to charge the capacitance 3 which has one terminal connected to earth. The other terminal of the capacitance is connected to a series connection comprising a first switch 4 which may be a MOSFET switch, a resistance 5, a second switch 6 which may again be a MOSFET switch and earth. The resistor 5 may form the initiator for a pyrotechnic charge which may form the operative part of a gas generator adapted to generate gas to inflate an air bag or which may form part of a pre-tensioner, that is to say, a device adapted to apply tension to a safety belt in the event that an accident should occur, or some other safety device within a motor vehicle.

The control circuit incorporates an arming or crash risk sensor 7 which is connected to a pulse generator 8, the output of which is adapted to control the switch 6 which may be considered to be an arming switch. The arming sensor comprises a sensor adapted to indicate that there is a risk that an accident may occur. The pulse generator may generate a pulse of a minimum predetermined length to ensure that the arming switch 6 is maintained closed in the event that an accident should arise.

The switch 4 is controlled by means of an accelerometer 9, which determines the instantaneous acceleration of a vehicle in which the arrangement is fitted, the output of which is connected to a microprocessor 10 which, for example, determines if the acceleration (or an integrated value calculated from the acceleration) fits within a predetermined "profile". The "profile" corresponds with a crash condition. If the sensed acceleration is within a predetermined profile, the switch 4 is closed. The combination of the accelerometer 9 and the micro-processor 10 comprises a crash sensor.

When both the switch 4 and the switch 6 are closed, the capacitance 3 discharges through the resistance 5, igniting the pyrotechnic charge.

If there is any leakage through the switch 4, in the event that the switch 6 is closed, for example by the vehicle traversing a bumpy road, the charge stored on the capacitance 3 may leak away through the resistance 5.

Should the switch 4 fail, and become conductive, the squib would ignite as soon as the switch 6 is closed.

Figure 2:
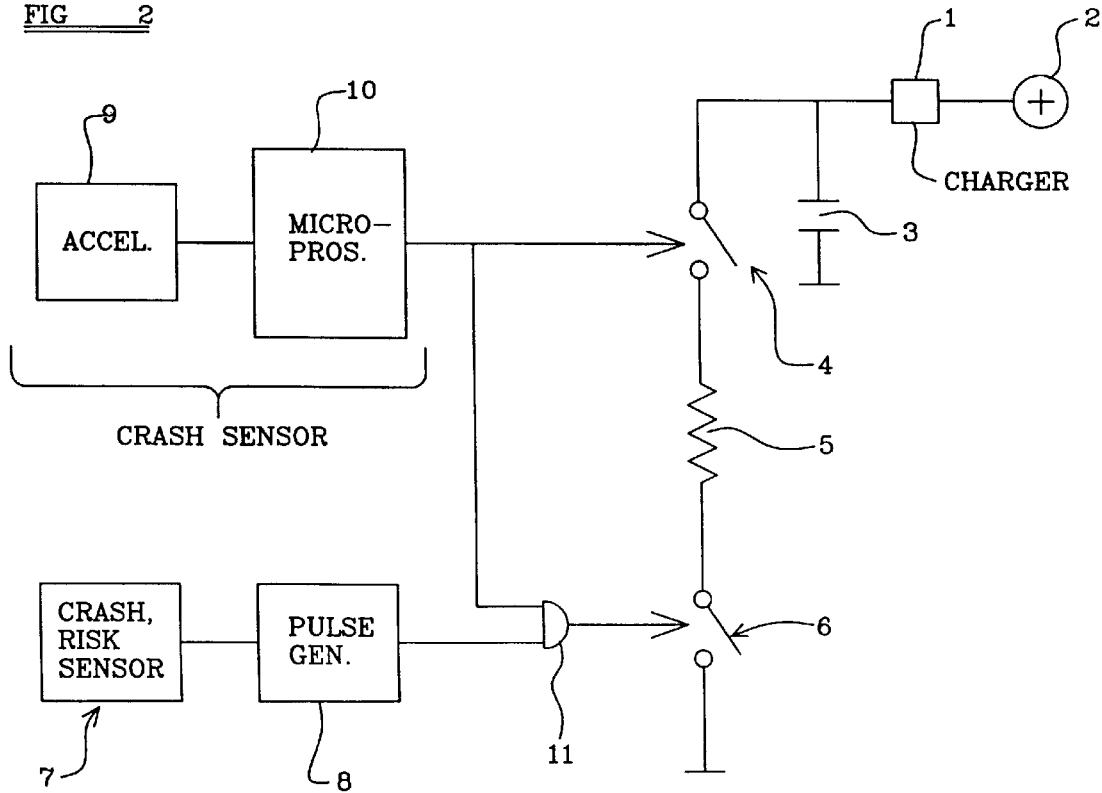
FIG. 2 is a block diagram of a circuit in accordance with the invention.

Referring now to FIG. 2 of the accompanying drawings, it can be seen that in an arrangement in accordance with the invention, there is again a charging circuit 1 associated with a battery 2 adapted to charge capacitance 3, which has a terminal connected to earth. The capacitance 3 is again connected by means of a switch 4 through a resistance 5 and a further switch 6 to earth, the switches 4 and 6 both being, typically, MOSFET switches.

As in FIG. 1, the switch 4 is closed in response to a signal generated by the combination of an accelerometer 9 and a microprocessor 10.

A safing or crash risk sensor 7 is provided associated with a pulse generator 8 adapted to close the safing switch 6. The safing sensor 7 may comprise a spring-biassed mass adapted to respond to a medium level of acceleration. The pulse generator 8 may be adapted to generate a pulse having an extended duration of approximately 220 ms. It is to be appreciated, however, that in alternative embodiments of the invention, the components 7 and 8 may be replaced by other equivalent components adapted to generate a signal whenever there is a risk of an accident occurring.

The output of the pulse generator 8 is connected to one input of an AND-gate 11. The other input of the AND-gate 11 is an output from the microprocessor 10. The output of the AND-gate 11 controls actuation of the switch 6.

It is to be appreciated that the switch 6 will only be closed when there is an appropriate output from both the safing sensor and from the microprocessor 10. This means that even if there is leakage through the upper switch 4, the capacitance will not be discharged, and also even if the upper switch 4 fails and becomes conductive, the squib will not be ignited.

Figure 3:
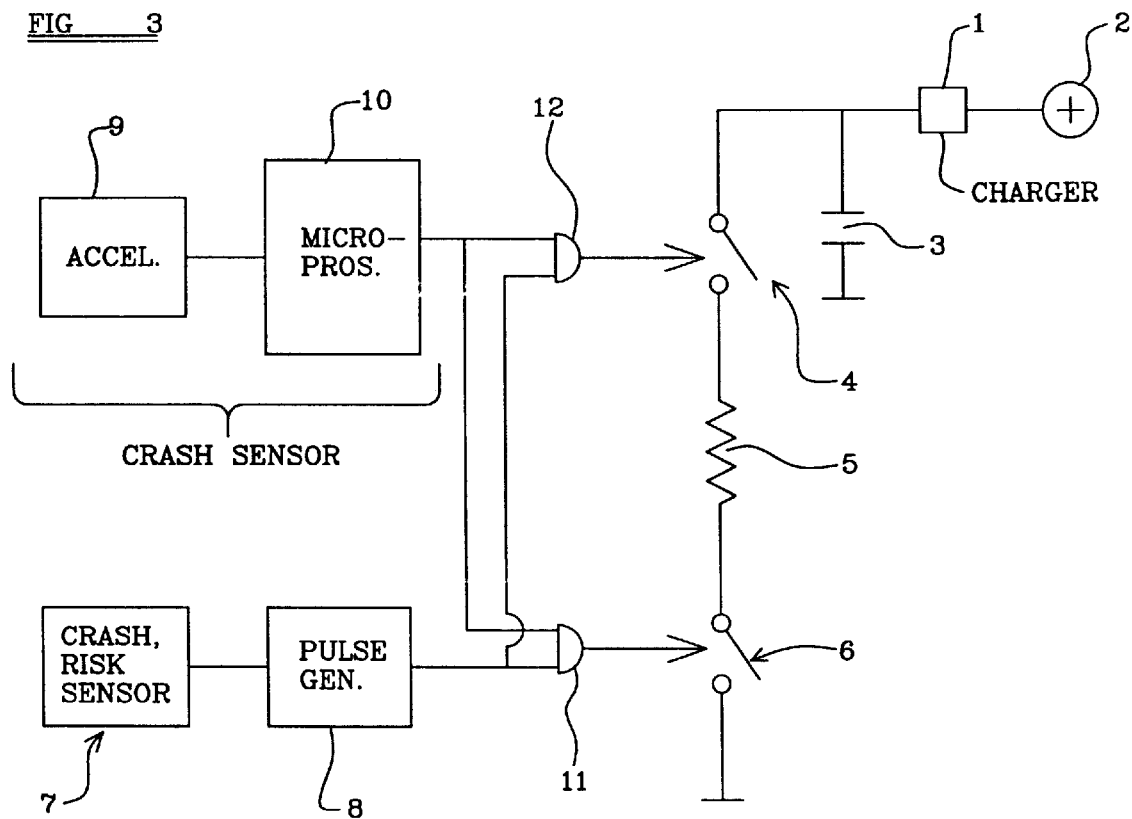
FIG. 3 is a view corresponding to FIG. 2 but illustrates a modified embodiment of the invention.

Referring now to FIG. 3, a further AND-gate 12 is provided. The inputs of the AND-gate 12 are connected to the safing sensor 8 and the micro-processor 10. The output of the AND-gate 12 controls the actuation of the switch 4. The AND-gate 12 provides a further degree of protection in case the lower side of the resistor 5 is grounded by mistake.

What is claimed is:

1. An electronic control circuit for a vehicle safety device, comprising:
    an electrical activator responsive to a flow of current therethrough to activate the safety device, the electrical activator being present in a series connection, comprising the activator and two switches, the series connection forming at least part of an electric circuit, the control circuit further comprising a crash sensor producing an output signal when an accident is detected, and a crash risk sensor producing an output signal when a certain crash risk is detected, one of the switches being closed in response to at least the output signal from the crash sensor, the other switch being closed in response to the output signals coming both from the crash sensor and from the crash risk sensor.

2. The circuit according to claim 1 wherein the crash sensor is responsive to acceleration.

3. The circuit according to claim 2 wherein the crash sensor includes an accelerometer and a microprocessor or computer means for processing an output signal from the accelerometer.

4. The circuit according to claim 1, further including a pulse generator having an input coupled to the output signal of the crash risk sensor for being activated by the crash risk sensor to generate an output pulse of a predetermined minimum duration.

5. The circuit according to claim 1, further including an AND-gate, wherein the output signal from the crash sensor and the output signal from the crash risk sensor are each fed to inputs of the AND-gate, the other switch being closed by output of the AND-gate.

6. The circuit according to claim 1, wherein the switches are located, in the series connection, on opposite sides of the electrical activator, the electrical activator thus being electrically isolated when the switches are both open.

7. The circuit according to claim 1, further including a capacitor and means for charging the capacitor forming an arrangement with the series connection such that when the two switches are both closed, electrical energy from the capacitor flows through the electrical activator.

8. The circuit according to claim 1 wherein said one switch is closed in response to the output signals coming both from the crash sensor and from the crash risk sensor.

* * * * *